US011037511B2

(12) United States Patent
Kobayashi

(10) Patent No.: US 11,037,511 B2
(45) Date of Patent: Jun. 15, 2021

(54) DISPLAY DRIVER, ELECTRONIC APPARATUS, AND MOBILE BODY

(71) Applicant: SEIKO EPSON CORPORATION, Tokyo (JP)

(72) Inventor: Hironori Kobayashi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/581,927

(22) Filed: Sep. 25, 2019

(65) Prior Publication Data

US 2020/0098319 A1 Mar. 26, 2020

(30) Foreign Application Priority Data

Sep. 26, 2018 (JP) ............................ JP2018-179823

(51) Int. Cl.
*G06F 1/00* (2006.01)
*G09G 3/3291* (2016.01)
*G09G 3/36* (2006.01)

(52) U.S. Cl.
CPC ......... *G09G 3/3291* (2013.01); *G09G 3/3696* (2013.01); *G09G 2310/0289* (2013.01)

(58) Field of Classification Search
CPC ................................. G09G 3/36; G06F 3/041
See application file for complete search history.

(56) References Cited

U.S. PATENT DOCUMENTS

2011/0241725 A1* 10/2011 Ikenaga ........... H03K 19/00392 326/16
2014/0347297 A1* 11/2014 Tsuji ....................... G06F 3/044 345/173
2015/0370279 A1* 12/2015 Akahane ................ G05F 3/185 327/541
2016/0232867 A1* 8/2016 Iwasaki ................ G09G 3/3648

FOREIGN PATENT DOCUMENTS

JP 2008-203410 A 9/2008
JP 2016-143029 A 8/2016
JP 2017-097174 A 6/2017

* cited by examiner

*Primary Examiner* — Michael A Faragalla
(74) *Attorney, Agent, or Firm* — Oliff PLC

(57) ABSTRACT

A display driver (10) includes a power supply circuit (60) that generates at least one power supply voltage, a drive circuit (20) that drives an electro-optical panel (150) based on the at least one power supply voltage, and a control circuit (50) that controls the power supply circuit (60) based on a control signal, a first monitoring circuit (M1) that monitors the control signal on the control circuit (50) side, and a second monitoring circuit (M2) that monitors the control signal on the power supply circuit (60) side.

13 Claims, 11 Drawing Sheets

| PA[3:0], PB[1:0], PC[4:0], | VONREG[V] | VOFREG[V] | VGL[V] |
|---|---|---|---|
| 00h | 0.00 | 4.50 | -5.00 |
| 01h | 1.50 | 4.66 | -5.50 |
| 02h | 1.75 | 4.84 | -6.00 |
| 03h | 2.00 | 5.00 | -6.50 |
| 04h | 2.25 | - | -7.00 |
| 05h | 2.50 | - | -7.50 |
| 06h | 2.75 | - | -8.00 |
| 07h | 3.00 | - | -8.50 |
| 08h | 3.25 | - | -9.00 |
| 09h | 3.75 | - | -9.50 |
| 0Ah | 4.00 | - | -10.00 |
| 0Bh | 4.25 | - | -10.50 |
| 0Ch | 4.50 | - | -11.00 |
| 0Dh | 4.75 | - | -11.50 |
| 0Eh | 5.00 | - | -12.00 |
| 0Fh | - | - | -12.50 |
| 10h | - | - | -13.00 |
| 11h | - | - | -13.50 |
| 12h | - | - | -14.00 |
| 13h | - | - | -14.50 |
| 14h | - | - | -14.50 |
| 15h | - | - | -14.50 |
| 16h | - | - | -14.50 |
| 17h | - | - | -14.50 |
| 18h | - | - | -14.50 |
| 19h | - | - | -14.50 |
| 1Ah | - | - | -14.50 |
| 1Bh | - | - | -14.50 |
| 1Ch | - | - | -14.50 |
| 1Dh | - | - | -14.50 |
| 1Eh | - | - | -14.50 |
| 1Fh | - | - | -14.50 |

FIG. 6

| VGL[V] | VDDHG[V] | VONREG[V] | | | | | | | | | | | | | | |
|---|---|---|---|---|---|---|---|---|---|---|---|---|---|---|---|---|
| | 0.00 | 1.50 | 1.75 | 2.00 | 2.25 | 2.50 | 2.75 | 3.00 | 3.25 | 3.50 | 3.75 | 4.00 | 4.25 | 4.50 | 4.75 | 5.00 |
| −5.0 | | | | | | | | | | 12.0 | 12.5 | 13.0 | 13.5 | 14.0 | 14.5 | 15.0 |
| −5.5 | | | | | | | | | 12.0 | 12.5 | 13.0 | 13.5 | 14.0 | 14.5 | 15.0 | 15.5 |
| −6.0 | | | | | | | | 12.0 | 12.5 | 13.0 | 13.5 | 14.0 | 14.5 | 15.0 | 15.5 | 16.0 |
| −6.5 | | | | | | | 12.0 | 12.5 | 13.0 | 13.5 | 14.0 | 14.5 | 15.0 | 15.5 | 16.0 | 16.5 |
| −7.0 | | | | | | 12.0 | 12.5 | 13.0 | 13.5 | 14.0 | 14.5 | 15.0 | 15.5 | 16.0 | 16.5 | 17.0 |
| −7.5 | | | | | 12.0 | 12.5 | 13.0 | 13.5 | 14.0 | 14.5 | 15.0 | 15.5 | 16.0 | 16.5 | 17.0 | 17.5 |
| −8.0 | | | | 12.0 | 12.5 | 13.0 | 13.5 | 14.0 | 14.5 | 15.0 | 15.5 | 16.0 | 16.5 | 17.0 | 17.5 | 18.0 |
| −8.5 | | | 12.0 | 12.5 | 13.0 | 13.5 | 14.0 | 14.5 | 15.0 | 15.5 | 16.0 | 16.5 | 17.0 | 17.5 | 18.0 | 18.5 |
| −9.0 | | 12.0 | 12.5 | 13.0 | 13.5 | 14.0 | 14.5 | 15.0 | 15.5 | 16.0 | 16.5 | 17.0 | 17.5 | 18.0 | 18.5 | |
| −9.5 | | 12.5 | 13.0 | 13.5 | 14.0 | 14.5 | 15.0 | 15.5 | 16.0 | 16.5 | 17.0 | 17.5 | 18.0 | 18.5 | | |
| −10.0 | 10.0 | 13.0 | 13.5 | 14.0 | 14.5 | 15.0 | 15.5 | 16.0 | 16.5 | 17.0 | 17.5 | 18.0 | 18.5 | | | |
| −10.5 | 10.5 | 13.5 | 14.0 | 14.5 | 15.0 | 15.5 | 16.0 | 16.5 | 17.0 | 17.5 | 18.0 | 18.5 | | | | |
| −11.0 | 11.0 | 14.0 | 14.5 | 15.0 | 15.5 | 16.0 | 16.5 | 17.0 | 17.5 | 18.0 | 18.5 | | | | | |
| −11.5 | 11.5 | 14.5 | 15.0 | 15.5 | 16.0 | 16.5 | 17.0 | 17.5 | 18.0 | 18.5 | | | | | | |
| −12.0 | 12.0 | 15.0 | 15.5 | 16.0 | 16.5 | 17.0 | 17.5 | 18.0 | 18.5 | | | | | | | |
| −12.5 | 12.5 | 15.5 | 16.0 | 16.5 | 17.0 | 17.5 | 18.0 | 18.5 | | | | | | | | |
| −13.0 | 13.0 | 16.0 | 16.5 | 17.0 | 17.5 | 18.0 | 18.5 | | | | | | | | | |
| −13.5 | 13.5 | 16.5 | 17.0 | 17.5 | 18.0 | | | | | | | | | | | |
| −14.0 | 14.0 | 17.0 | 17.5 | | | | | | | | | | | | | |
| −14.5 | 14.5 | | | | | | | | | | | | | | | |

VEE=−15V

VEE=−14.5V

VEE=−14V

VEE=−13.5V

FIG. 7

| AD[9] | AD[8] | SCAN LINE |
|---|---|---|
| 0 | 0 | G1 |
| 0 | 1 | G2 |
| 0 | 2 | G3 |
| ⋮ | ⋮ | ⋮ |
| 0 | 511 | G512 |

FIG. 10

| AD[9] | AD[8:0] |
|---|---|
| 1 | 0 |
| 1 | 1 |
| 1 | 2 |
| ⋮ | ⋮ |
| 1 | 511 |

FIG. 11

DISPLAY DRIVER, ELECTRONIC APPARATUS, AND MOBILE BODY

The present application is based on, and claims priority from JP Application Serial Number 2018-179823, filed Sep. 26, 2018, the disclosure of which is hereby incorporated by reference herein in its entirety.

BACKGROUND

1. Technical Field

The present disclosure relates to a display driver, an electronic apparatus, a mobile body, and the like.

2. Related Art

In a display driver, control signals for setting operations of analog circuits such as a power supply circuit and a drive circuit are stored in a register. Various operation settings relating to a power supply voltage to be generated by a built-in power supply and the size of a panel to be driven by the display driver are set based on the control signals stored in the register. If these operation settings are set to a setting that is inhibited from a design viewpoint or due to a specification issue, it is possible that the display driver operates anomalously, or an IC in the display driver fails. In order to protect the display driver from such an anomaly or failure, whether the operation setting is an inhibited setting is detected by monitoring each control signal stored in the register inside a logic circuit. If the operation setting is an inhibited setting, the logic circuit changes the corresponding control signal in the register to an initial value, and transmits error information to a host device.

Technology for protecting a display driver from an anomaly or failure is disclosed in JP-A-2016-143029, for example. In JP-A-2016-143029, in order to prevent deterioration of display pixels due to a power cutoff or data cutoff of the display driver, a power cutoff detection circuit and a data cutoff detection circuit are provided, and the power cutoff detection circuit and the data cutoff detection circuit perform appropriate shutdown control.

Since the inhibited setting is monitored inside a logic circuit in a known technology, as described above, there is a problem in that whether the setting is actually an inhibited setting cannot be monitored on an analog circuit side. That is, if an anomaly occurs in a control signal line through which a control signal is output from the register to the analog circuit, it is possible that, in spite of the control signal being normal on the logic circuit side, the control signal is in an inhibited setting on the analog circuit side. For example, if a disconnection occurs in the control signal line, and the control signal line is short-circuited to a power supply or the like on the analog circuit side, the level of the control signal may differ between the logic circuit side and the analog circuit side. As described above, there is a problem in that an inhibited setting may occur on the analog circuit side by merely monitoring whether an inhibited setting occurs inside the logic circuit.

SUMMARY

One aspect of the present disclosure relates to a display driver including: a power supply circuit that generates at least one power supply voltage; a drive circuit that drives an electro-optical panel based on the at least one power supply voltage; a control circuit that controls the power supply circuit based on a control signal; a first monitoring circuit that monitors the control signal on the control circuit side; and a second monitoring circuit that monitors the control signal on the power supply circuit side.

BRIEF DESCRIPTION OF THE DRAWINGS

The disclosure will be described with reference to the accompanying drawings, wherein like numbers reference like elements.

FIG. 6 is an example of voltages to be generated by the power supply circuit.

FIG. 7 is a diagram illustrating an inhibited setting in which the power supply voltage exceeds the breakdown voltage of a transistor.

FIG. 10 is an example of addresses for designating scan lines.

FIG. 11 is an example of the inhibited setting of the address.

DESCRIPTION OF EXEMPLARY EMBODIMENTS

The following is a detailed description of preferred embodiments of the present disclosure. Note that the embodiments described below are not intended to unduly limit the content of the invention recited in the claims, and all of the configurations described in the embodiments are not necessarily essential as solutions provided by the present disclosure.

1. First Exemplary Configuration

Figure 1:
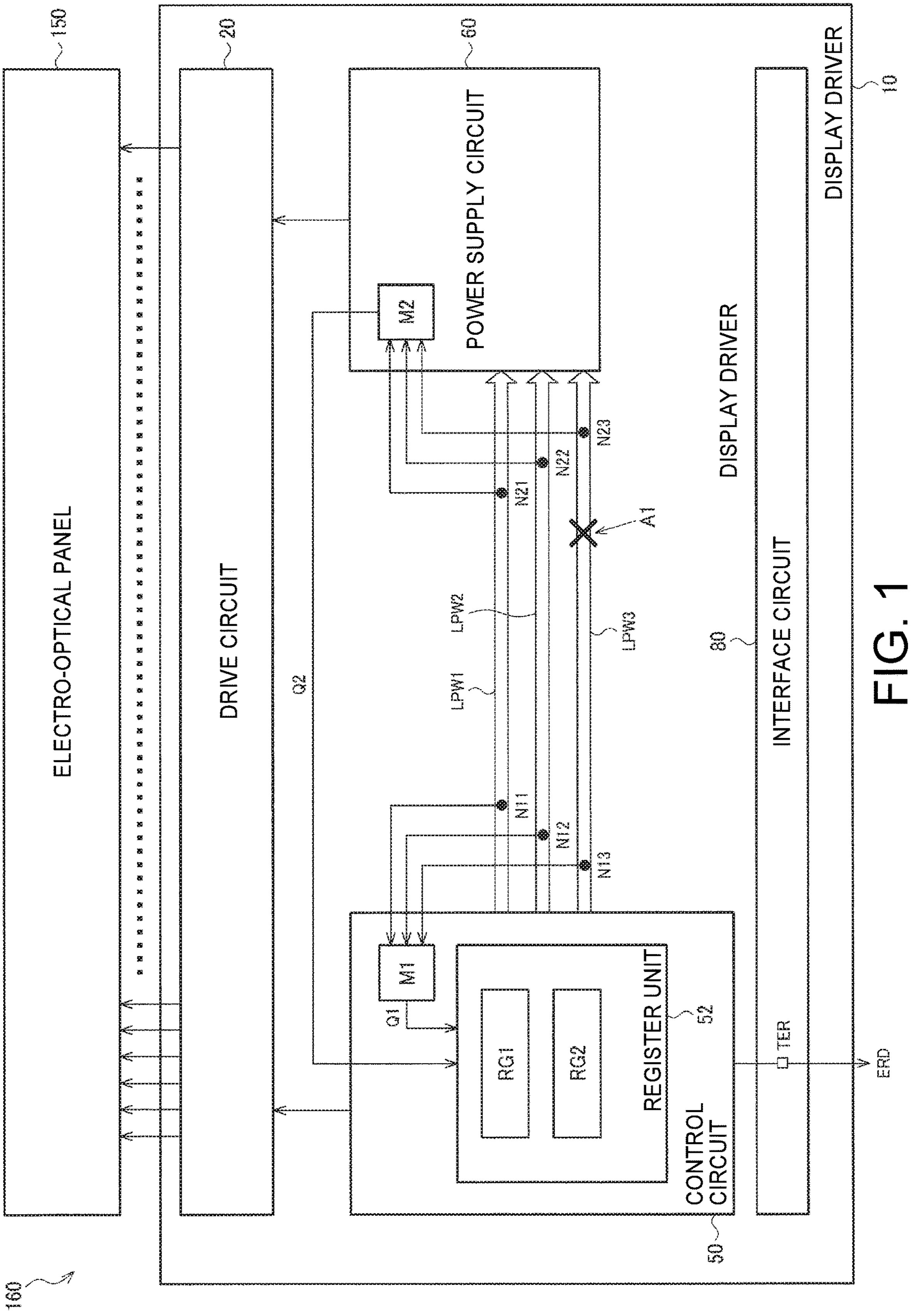
FIG. 1 is a first exemplary configuration of a display driver of a present embodiment.

FIG. 1 shows a first exemplary configuration of a display driver 10 of a present embodiment. The display driver 10 includes a drive circuit 20, a control circuit 50, a power supply circuit 60, control signal lines LPW1 to LPW3, and monitoring circuits M1 and M2. Also, the display driver 10 may include an interface circuit 80. An electro-optical device 160 can be constituted by the display driver 10 and an electro-optical panel 150, as shown in later-described FIG. 12.

The power supply circuit 60 generates at least one power supply voltage. That is, the power supply circuit 60 generates one or more power supply voltages. For example, the power supply circuit 60 generates various power supply voltages needed to drive the electro-optical panel 150. Specifically, the power supply circuit 60 generates a plurality of power supply voltages to be used by the drive circuit 20 by performing a voltage step-up operation and a voltage step-down operation based on a power supply voltage that is input from the outside, and supplies the generated power supply voltages to the drive circuit 20. For example, the power supply circuit 60 generates power supply voltages needed to drive data lines and scan lines of the electro-optical panel 150, and supplies the generated power supply voltages to the drive circuit 20. This power supply circuit 60 can be realized by a DC/DC converter, a linear regulator, and the like. Specifically, the power supply circuit 60 can be realized by a charge pump circuit that performs a charge pumping operation such as a step-up operation using a charge pump capacitor, or the like.

The control circuit 50 is a logic circuit that performs various types of control processing such as display control of the electro-optical panel 150, control of circuits in the display driver 10, and interface processing with an external device. The control circuit 50 executes these types of control processing by outputting a control signal. The control circuit 50 can be realized by a gate array or the like that is designed with use of an automatic placement and routing method. The control circuit 50 controls the power supply circuit 60 based on the control signal. For example, the control circuit 50 sets the voltage value of the power supply voltage to be generated by the power supply circuit 60, for example. For example, the control circuit 50 sets a step-up magnification rate of a DC/DC converter, and sets an output voltage value of a linear regulator. The control signal is constituted by a multi-bit signal or a 1-bit signal. If the control signal is constituted by a multi-bit signal, the control signal may be a parallel signal or a serial signal. When the control signal is a parallel signal, the signal of each bit is transmitted through one control signal line. When the control signal is a serial signal, a multi-bit signal is transmit through one control signal line as a time division signal. Note that, in the following, a case will be described where the control circuit 50 controls the power supply circuit 60 using 3-bit control data as the control signal, and the 3-bit control data is transmitted through three control signal lines as a parallel signal, as an example, but there is no limitation thereto. That is, the control circuit 50 need only control the power supply circuit 60 based on a multi-bit signal or a 1-bit signal. Also, the control circuit 50 may output the multi-bit control data to the power supply circuit 60 as a serial signal. In this case, the number of control signal lines is less than the number of bits of the control data.

The control signal from the control circuit 50 is transmitted to the power supply circuit 60 through the control signal lines LPW1 to LPW3. The control circuit 50 outputs a 1-bit signal to one control signal line. That is, a signal at a high level or a low level is output to each of the control signal lines LPW1 to LPW3. The control signal lines LPW1 to LPW3 constitutes a signal path through which a parallel-signal control signal is transmitted. The control signal lines LPW1 to LPW3 are realized by an aluminum interconnect layer or the like that is formed on a semiconductor substrate of a display driver 10, which is a semiconductor chip. Note that the number of control signal lines is not limited to three, and it is sufficient that the display driver 10 is provided with at least one control signal line.

The electro-optical panel 150 is a panel for displaying images, and is realized by a liquid-crystal panel, an organic EL panel, or the like. An active matrix type panel that uses a switch element such as a thin film transistor (TFT) can be adopted as the liquid-crystal panel. Specifically, the display panel, which is the electro-optical panel 150, includes a plurality of pixels. For example, the electro-optical panel 150 includes a plurality of pixels that are arranged in a matrix. Also, the electro-optical panel 150 includes a plurality of data lines and a plurality of scan lines that are routed in a direction that intersects the plurality of data lines. The data line is also referred to as a source line, and the scan line is also referred to as a gate line. Also, in the electro-optical panel 150, a plurality of pixels are provided at respective areas where the data lines intersect the scan lines. Also, in a case of an active matrix type panel, a switch element such as a thin film transistor is provided in each pixel region. Also, the electro-optical panel 150 realizes the display operation by changing the optical property of an electro-optical element at each pixel region. The electro-optical element is a liquid crystal element, an EL element, or the like. Note that, in a case of an organic EL panel, a pixel circuit for current-driving an EL element is provided in each pixel region.

The drive circuit 20 drives the electro-optical panel 150 based on the power supply voltages. For example, the drive circuit 20 drives the data lines of the electro-optical panel 150 based on a power supply voltage for driving data lines that is supplied from the power supply circuit 60. For example, the drive circuit 20 drives each data line of the electro-optical panel 150 by outputting a data voltage corresponding to display data to the data line. For example, the drive circuit 20 selects a voltage corresponding to the display data from a plurality of tone voltages supplied from a tone voltage generation circuit, and outputs the selected voltage to the data line as the data voltage. Note that the electro-optical panel 150 may be provided with demultiplexing switch elements, and each amplifier circuit included in the drive circuit 20 may output data voltages corresponding to a plurality of data lines of the electro-optical panel 150 in a time division manner. Also, the drive circuit 20 drives the scan lines of the electro-optical panel 150 based on a power supply voltage for driving scan lines that is supplied from the power supply circuit 60. For example, the drive circuit 20 performs driving for selecting a scan line using a scan line selection voltage corresponding to the power supply voltage for driving scan lines. For example, the drive circuit 20 performs an operation such that the plurality of scan lines are line-sequentially selected.

The monitoring circuit M1 is a circuit that monitors the control signal on the control circuit 50 side. The monitoring circuit M2 is a circuit that monitors the control signal on the power supply circuit 60 side. A 3-bit signal is output to the control signal lines LPW1 to LPW3. The monitoring circuits M1 and M2 monitor the control signal by determining whether or not the combination of logic levels of the 3 bits is an inhibited setting. The monitoring circuit M1 is a first monitoring circuit, and the monitoring circuit M2 is a second monitoring circuit.

Specifically, the monitoring circuit M1 monitors the voltages at nodes N11 to N13, of the control signal lines LPW1 to LPW3, that are closer to the control circuit 50 than to the power supply circuit 60. Also, the monitoring circuit M1 outputs the monitoring result to the control circuit 50. For example, the monitoring circuit M1 outputs the monitoring result to the control circuit 50 as a detection signal Q1. The nodes, of the control signal lines LPW1 to LPW3, that are closer to the control circuit 50 than to the power supply circuit 60 are nodes, on routes of the control signal lines LPW1 to LPW3, whose distances to the control circuit 50 are smaller than those to the power supply circuit 60. That is, as shown in FIG. 1, the distances between the nodes N11 to N13 and the control circuit 50 are respectively smaller than the distances between the nodes N11 to N13 and the power supply circuit 60, on the routes of the control signal lines LPW1 to LPW3.

For example, the monitoring circuit M1 is provided inside the control circuit 50. That is, the monitoring circuit M1 is placed in the placement region of the control circuit 50. Also, the monitoring circuit M1 monitors the control signal at the output nodes N11 to N13 to the control signal lines LPW1 to LPW3 in the control circuit 50. That is, the monitoring circuit M1 monitors the control signal of the control signal lines LPW1 to LPW3 inside the control circuit 50.

The monitoring circuit M2 monitors the voltages at nodes N21 to N23, of the control signal lines LPW1 to LPW3, that are closer to the power supply circuit 60 than to the control circuit 50. Also, the monitoring circuit M2 outputs the monitoring result to the control circuit 50. For example, the monitoring circuit M2 outputs the monitoring result to the control circuit 50 as a detection signal Q2. The nodes, of the control signal lines LPW1 to LPW3, that are closer to the power supply circuit 60 than to the control circuit 50 are nodes, on routes of the control signal lines LPW1 to LPW3, whose distances to the power supply circuit 60 are smaller than those to the control circuit 50. That is, as shown in FIG. 1, the distances between the nodes N21 to N23 and the power supply circuit 60 are respectively smaller than the distances between the nodes N21 to N23 and the control circuit 50, on the routes of the control signal lines LPW1 to LPW3.

For example, the monitoring circuit M2 is provided inside the power supply circuit 60. That is, the monitoring circuit M2 is placed in the placement region of the power supply circuit 60. Also, the monitoring circuit M2 monitors the control signal at the input nodes N21 to N23 of the control signal lines LPW1 to LPW3 in the power supply circuit 60. That is, the monitoring circuit M2 monitors the control signal of the control signal lines LPW1 to LPW3 inside the power supply circuit 60.

In the present embodiment, as described above, the two monitoring circuits M1 and M2 are provided as the circuits for monitoring the control signal of the control signal lines LPW1 to LPW3. As a result of monitoring the control signal of the control signal lines LPW1 to LPW3 by providing the monitoring circuits M1 and M2 in this way, an inhibited setting caused by a disconnection of the control signal lines LPW1 to LPW3 or the like can be prevented, and the analysis when an inhibited setting has occurred can be facilitated. The inhibited setting refers to a setting that is inhibited due to a specification issue or from a design viewpoint, because the setting may incur an anomaly in operation, a failure, a breakdown, or the like of the analog circuit.

For example, as a method of a comparative example of the present embodiment, a method is conceivable in which the monitoring circuit is provided only on the control circuit 50 side. With this method of the comparative example, when the control signal output from the control circuit 50 is in an inhibited setting, this fact can be detected and appropriate measures can be taken. For example, when the monitoring circuit detects an inhibited setting, the control circuit 50 initializes the setting and outputs a control signal corresponding to its initial value. With this, an anomaly in operation, failure, breakdown, or the like caused by the inhibited setting can be prevented.

However, with the method of the comparative example, when an anomaly such as a disconnection in the control signal lines LPW1 to LPW3 has occurred, this anomaly cannot be detected. For example, if a disconnection occurs in the control signal line LPW3, as shown by A1 in FIG. 1, it is possible that the control signal at the node N23 on the power supply circuit 60 side is fixed to a high level or a low level. For example, it is possible that, although the control circuit 50 outputs "HHL" to the control signal lines LPW1 to LPW3, the power supply circuit 60 receives "HHH". Here, even if "HHH" is an inhibited setting, since the level of the control signal lines LPW1 to LPW3 on the control circuit 50 side is "HHL", the monitoring circuit provided on the control circuit 50 side cannot detect the inhibited setting on the power supply circuit 60 side. In particular, when the display driver 10 is installed in an on-board apparatus, high reliability is required, but there is a risk that it is difficult to satisfy this reliability requirement with the method of the comparative example.

In contrast, with the display driver 10 of the present embodiment, when an anomaly occurs such as a disconnection in the control signal lines LPW1 to LPW3, the occurrence of the anomaly can be detected by the monitoring circuit M2 provided on the power supply circuit 60 side monitoring the control signal at the nodes N21 to N23. That is, not only an anomaly on the control circuit 50 side, but also an anomaly on the power supply circuit 60 side can be detected. Also, the control circuit 50 can be notified of the occurrence of an anomaly using the detection signal Q2, and as a result, anomalous operation due to an inhibited setting can be prevented from being performed and the reliability thereof can be improved. Also, when an anomaly in which the control circuit 50 does not output an appropriate control signal has occurred, the occurrence of the anomaly can be detected by the monitoring circuit M1 provided on the control signal side monitoring the control signal at the nodes N11 to N13. Also, the control circuit 50 can be notified of the occurrence of an anomaly using the detection signal Q1, and as a result, anomalous operation due to an inhibited setting can be prevented from being performed and the reliability thereof can be improved. Accordingly, the display driver 10 can be provided that can be favorably installed in an electronic apparatus such as an on-board apparatus requiring high reliability.

Also, with the display driver 10 of the present embodiment, when an anomalous operation or the like of the analog circuit has occurred, it is possible to easily analyze whether the anomalous operation or the like is an anomaly caused by an inadequate control signal having been output from the control circuit 50, or an anomaly caused by a disconnection or the like in the control signal lines LPW1 to LPW3. For example, if the detection signal Q1 from the monitoring circuit M1 indicates an anomaly, it can be analyzed that the anomaly is caused by an inadequate control signal having been output from the control circuit 50. On the other hand, if the detection signal Q2 from the monitoring circuit M2 indicates an anomaly, it can be analyzed that the anomaly is caused by a disconnection or the like in the control signal lines LPW1 to LPW3. Therefore, the analysis to be performed when an anomaly has occurred can be facilitated.

The display driver 10 includes the interface circuit 80, as shown in FIG. 1. Also, the control circuit 50 includes a register unit 52. These elements will be described in the following.

The interface circuit 80 is an interface circuit between the display driver 10 and an external device. The interface circuit 80 is an I/O circuit of the display driver 10, which is an integrated circuit device, and is provided with a plurality of I/O cells. Each I/O cell is provided with a terminal, which is a pad, an input buffer and an output buffer or an input/output buffer, and a protection circuit such as an electrostatic protection circuit.

The register unit 52 includes a register to which an external device such as a host can access via the interface circuit 80. For example, the register unit 52 includes a register RG1 that stores an error detection result based on the detection signal Q1 and a register RG2 that stores an error detection result based on the detection signal Q2.

The control circuit 50 performs processing for notifying an external device of the error, when one of the monitoring result of the monitoring circuit M1 and the monitoring result of the monitoring circuit M2 indicates that an error has been detected. For example, the control circuit 50 detects an error indicated by the monitoring result of the monitoring circuit M1 based on the detection signal Q1 from the monitoring circuit M1. That is, the control circuit 50 detects error information of the control signal at the nodes N11 to N13 based on the detection signal Q1. Also, the control circuit 50 detects an error indicated by the monitoring result of the monitoring circuit M2 based on the detection signal Q2 from the monitoring circuit M2. That is, the control circuit 50 detects error information of the control signal at the nodes N21 to N23 based on the detection signal Q2. When an error occurs that is an anomaly in which an appropriate control signal is not output from the control circuit 50, the control circuit 50 is notified of the error using the detection signal Q1. Also, when an error occurs that is an anomaly in which a disconnection or the like occurs in the control signal lines LPW1 to LPW3, the control circuit 50 is notified of the error using the detection signal Q2. Also, the control circuit 50 performs processing for notifying an external device, such as a host, of an occurrence of this error. In this way, the external device can execute appropriate processing for handling the error that has occurred. For example, the external device such as a host, upon determining that an error has occurred in the output of the control signal based on the monitoring result of the monitoring circuit M1, initializes the setting stored in the register of the register unit 52 via the interface circuit 80. The setting here is a setting corresponding to the control signal of the control signal lines LPW1 to LPW3. Also, the external device such as a host, upon determining that an error such as a disconnection has occurred in the control signal lines LPW1 to LPW3 based on the monitoring result of the monitoring circuit M2, instructs to turn off display of the electro-optical panel 150, and to turn off the operation of the power supply circuit 60.

Also, the display driver 10 of the present embodiment includes a terminal TER for outputting an error detection signal ERD to an external device. For example, the terminal TER is provided in the interface circuit 80, in FIG. 2. For example, the terminal TER is a pad provided in an I/O cell, of the interface circuit 80, for outputting a signal. The error detection signal ERD is output to the external device through the terminal TER. With this, an external device such as a host can determine that the monitoring circuit M1 or M2 has detected an error using the error detection signal ERD output from the terminal TER. The error detection signal ERD may be an interrupt signal output to the external device such as a host. For example, the display driver 10 is provided with a plurality of error detection circuits including the monitoring circuits M1 and M2. If one of the plurality of error detection circuits has detected an error, the external device is notified of the occurrence of an error using the detection signal ERD, which is an interrupt signal, and the external device is caused to perform interrupt processing.

A detection flag based on the monitoring result of the monitoring circuit M1 is set to the register RG1, and a detection flag based on the monitoring result of the monitoring circuit M2 is set to the register RG2. The register RG1 is a first register, and the register RG2 is a second register. The registers RG1 and RG2 can be realized by a flip-flop circuit or the like. The registers RG1 and RG2 may also be realized by a semiconductor memory such as a RAM. When the monitoring circuit M1 has detected an error, the detection flag of the register RG1 is set to "1", for example. When the monitoring circuit M2 has detected an error, the detection flag of the register RG2 is set to "1", for example. Also, the external device can access the registers RG1 and RG2 via the interface circuit 80. Therefore, the external device can determine that the monitoring circuit M1 or M2 has detected an error by reading out the detection flags of the registers RG1 and RG2. Specifically, when one of the plurality of error detection circuits including the monitoring circuits M1 and M2 has detected an error, the error detection signal ERD is output from the terminal TER, as an interrupt signal to the external device. That is, the error detection signal ERD is activated. When the detection signal ERD is activated in this way, the external device accesses the register unit 52, and analyses the error factor. Then, if the detection flag of the register RG1 is set to "1", the external device determines that the monitoring circuit M1 has detected an error. If the error detection flag of the register RG2 is set to "1", the external device determines that the monitoring circuit M2 has detected an error. With this, the external device can execute appropriate processing for handling the detected error.

2. Detailed Exemplary Configuration

Figure 2:
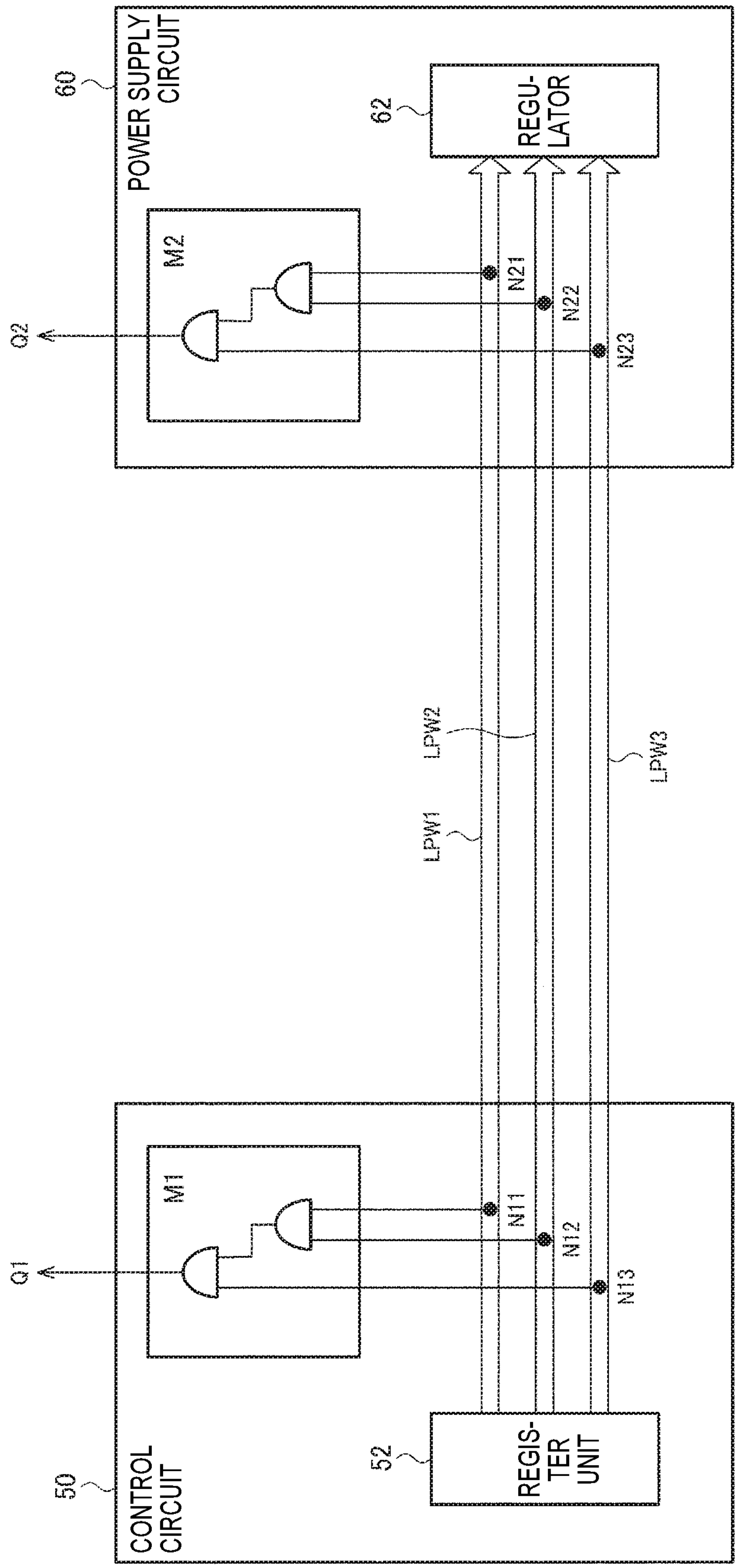
FIG. 2 is a detailed exemplary configuration and a first exemplary connection of a monitoring circuit.

FIG. 2 is a detailed exemplary configuration and a first exemplary connection of the monitoring circuits M1 and M2. The monitoring circuits M1 and M2 are each constituted by a combinational circuit of logic elements. The logic elements include an AND circuit, a NAND circuit, an OR circuit, a NOR circuit, an EXOR circuit, an EXNOR circuit, an inverter, and the like. The monitoring circuits M1 and M2 are combinational circuits of the same configuration. That is, if the control signals input to the respective monitoring circuits M1 and M2 are at the same logic level, the detection signals Q1 and Q2 are at the same logic level.

A configuration in which the inhibited setting is "HHH" is shown in FIG. 2 as an exemplary configuration of the monitoring circuits M1 and M2. The monitoring circuit M1 outputs Q1=H if the combination of bit logic levels at nodes N11 to N13 is "HHH", and outputs Q1=L if the combination of bit logic levels at nodes N11 to N13 is not "HHH". The monitoring circuit M2 outputs Q2=H if the combination of bit logic levels at nodes N21 to N23 is "HHH", and outputs Q2=L if the combination of bit logic levels at nodes N21 to N23 is not "HHH".

For example, ends of one side of the control signal lines LPW1 to LPW3 are connected to the register unit 52, and the ends of other side of the control signal lines LPW1 to LPW3 are connected to the regulator 62 of the power supply circuit 60. That is, a register of the register unit 52 outputs the control signal to the control signal lines LPW1 to LPW3, and the control signal is input to the regulator 62 through the control signal lines LPW1 to LPW3. The regulator 62 outputs a power supply voltage having a voltage value corresponding to the received control signal. For example, the nodes N11 to N13 are output nodes to the control signal lines LPW1 to LPW3 in the register unit 52, and the nodes N21 to N23 are input nodes, in the regulator 62, of the control signal lines LPW1 to LPW3.

Figure 3:
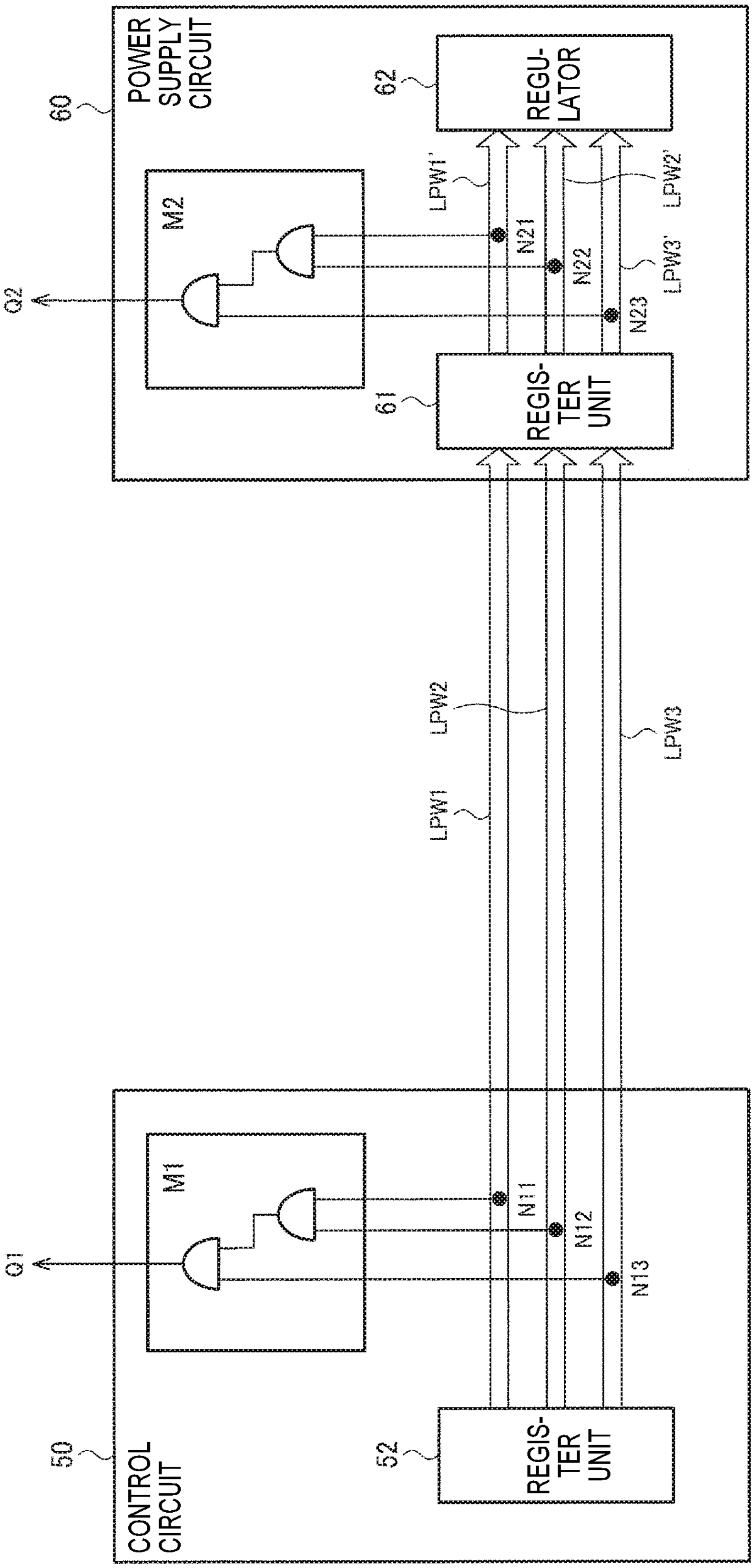
FIG. 3 is a second exemplary connection of the monitoring circuit.

FIG. 3 is a second exemplary connection of the monitoring circuits M1 and M2.

In FIG. 3, the power supply circuit 60 further includes a register unit 61. Also, the other ends of the control signal lines LPW1 to LPW3 are connected to the register unit 61. That is, the control signal output from the register of the register unit 52 to the control signal lines LPW1 to LPW3 is input to the register unit 61. The register unit 61 stores the received control signal. The register unit 61 outputs the stored control signal to the regulator 62 through control signal lines LPW1' to LPW3'. The regulator 62 outputs a power supply voltage having a voltage value corresponding to the control signal received through the control signal lines LPW1' to LPW3'. The nodes N21 to N23 are nodes of the control signal lines LPW1' to LPW3' that connect between the register unit 61 and the regulator 62.

In this exemplary connection, although the control signal is transmitted via the register unit 61, the control signal of the control signal lines LPW1 to LPW3 and the control signal of the control signal lines LPW1' to LPW3' are the same control signal. That is, in this exemplary connection as well, the monitoring circuit M1 monitors the control signal on the control circuit 50 side, and the monitoring circuit M2 monitors the control signal on the power supply circuit 60 side.

For example, assume a case where the control signal stored in the register unit 61 is re-written, due to an anomaly such as noise, to an inhibited setting. According to this exemplary connection, as a result of the monitoring circuit M2 monitoring the control signal output from the register unit 61 to the control signal lines LPW1' to LPW3', an anomaly in which the control signal stored in the register unit 61 is changed to an inhibited setting can be detected. Also, there is a risk that an inhibited setting is stored in the register unit 61 due to a disconnection or the like in the control signal lines LPW1 to LPW3. According to this exemplary connection, in such a case as well, an anomaly in which the control signal stored in the register unit 61 has been changed to an inhibited setting can be detected.

Note that, when the control circuit 50 outputs the control signal as a serial signal, the following configuration may be adopted, for example. That is, the control circuit 50 includes a parallel/serial conversion circuit that performs parallel/serial conversion on the control signal from the register unit 52. Also, the power supply circuit 60 includes a serial/parallel conversion circuit that performs serial/parallel conversion on the serial signal from the parallel/serial conversion circuit. The register unit 61 stores the parallel signal from the serial/parallel conversion circuit as the control signal. The parallel/serial conversion circuit and the serial/parallel conversion circuit are connected by one control signal line, for example.

Figure 4:
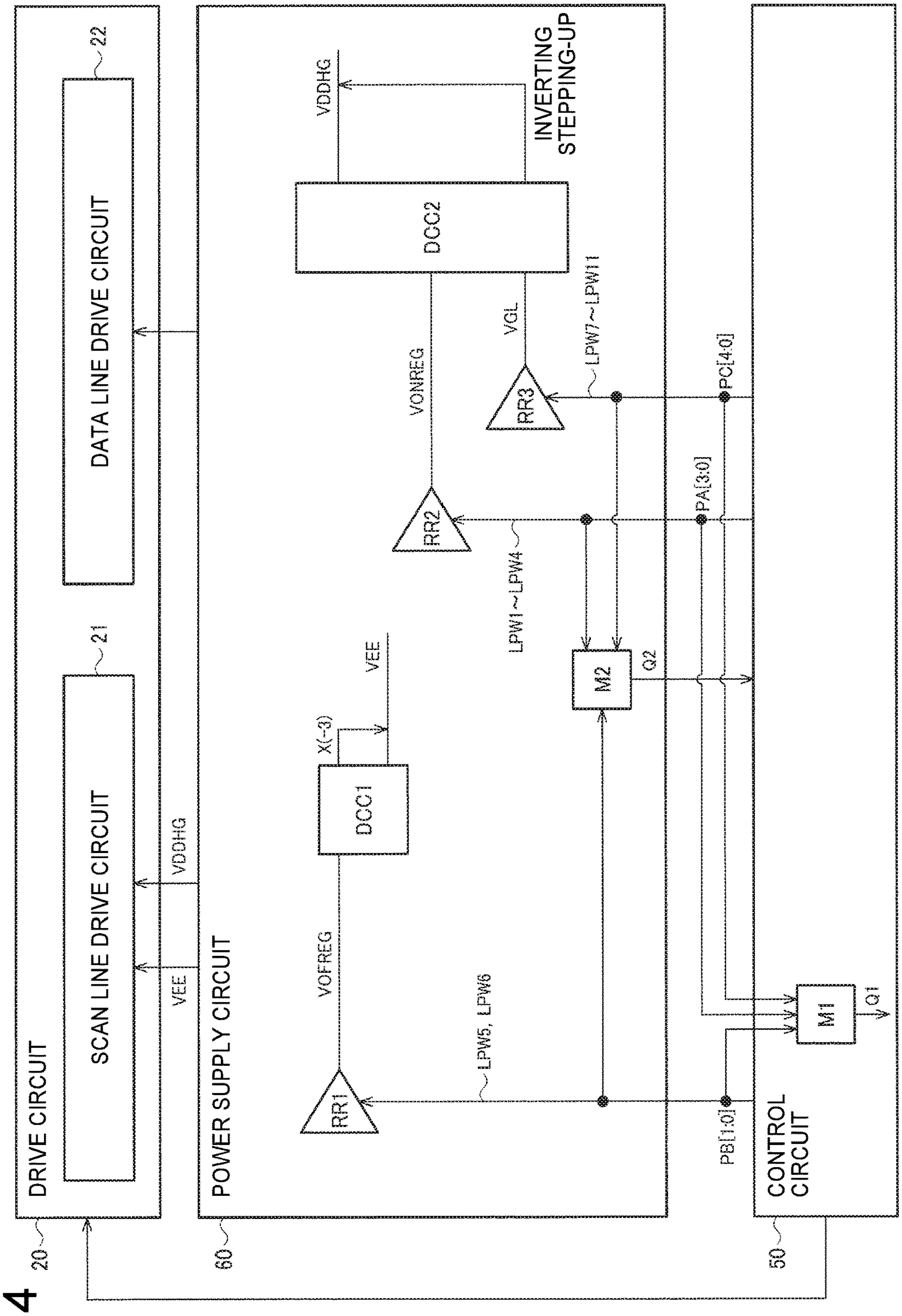
FIG. 4 is a detailed exemplary configuration of a drive circuit and a power supply circuit.

FIG. 4 is a detailed exemplary configuration of the drive circuit 20 and the power supply circuit 60.

The drive circuit 20 includes a scan line drive circuit 21 that drives scan lines of the electro-optical panel 150, and a data line drive circuit 22 that drives data lines of the electro-optical panel 150. The power supply circuit 60 generates power supply voltages VEE and VDDHG, and the scan line drive circuit 21 operates with the power supply voltages VEE and VDDHG. The power supply voltage VEE is a first power supply voltage, and the power supply voltage VDDHG is a second power supply voltage. The control circuit 50 outputs the control signal for setting the voltage values of the power supply voltages VEE and VDDHG to the power supply circuit 60. The monitoring circuits M1 and M2 monitor the control signal for setting the voltage values of the power supply voltages VEE and VDDHG.

Specifically, the power supply circuit 60 includes regulators RR1 to RR3 and DC/DC converters DCC1 and DCC2. The control circuit 50 outputs control data PB[1:0] to the regulator RR1, outputs control data PA[3:0] to the regulator RR2, and outputs control data PC[4:0] to the regulator RR3. Here, the control data PB[1:0], PA[3:0], and PC[4:0] are setting values, in hexadecimal number, for designating voltages VOFREG, VONREG, and VGL, as shown in later-described FIG. 6. The regulator RR1 generates the voltage VOFREG having a voltage value designated by the control data PB[1:0]. The regulator RR2 generates the voltage VONREG having a voltage value designated by the control data PA[3:0]. The regulator RR3 generates the voltage VGL having a voltage value designated by the control data PC[4:0]. The DC/DC converter DCC1 generates the power supply voltage VEE by performing a step-up operation on the voltage VOFREG to a voltage obtained by tripling the VOFREG and inverting the polarity, with reference to 0 V. That is, $VEE=-3\times VOFREG$. The DC/DC converter DCC2 generates the power supply voltage VDDHG by performing an inverting-step up operation on the voltage VGL, with reference to the voltage VONREG. That is, $VDDHG=VONREG+(VONREG-VGL)=2\times VONREG-VGL$.

The bit signals of control data PB[1:0], PA[3:0], and PC[4:0] each correspond to the control signal described above. That is, the control signals are transmitted through eleven control signal lines LPW1 to LPW11 in FIG. 4. For example, a 4-bit signal of PA[3:0] is transmitted through the control signal lines LPW1 to LPW4, a 2-bit signal of PB[1:0] is transmitted through the control signal lines LPW5 and LPW6, and a 5-bit signal of PC[4:0] is transmitted through the control signal lines LPW7 to LPW11. The monitoring circuits M1 and M2 monitor whether or not the combination of bit logic levels of the eleven control signal lines is an inhibited setting. The inhibited setting here is a setting with which the voltage difference between the power supply voltage VEE and the power supply voltage VDDHG exceeds the breakdown voltage of a transistor. The monitoring circuit M1 monitors whether or not the setting of the control signals is an inhibited setting on the control circuit 50 side. The monitoring circuit M2 monitors whether or not the setting of the control signals is an inhibited setting on the power supply circuit 60 side.

Figure 5:
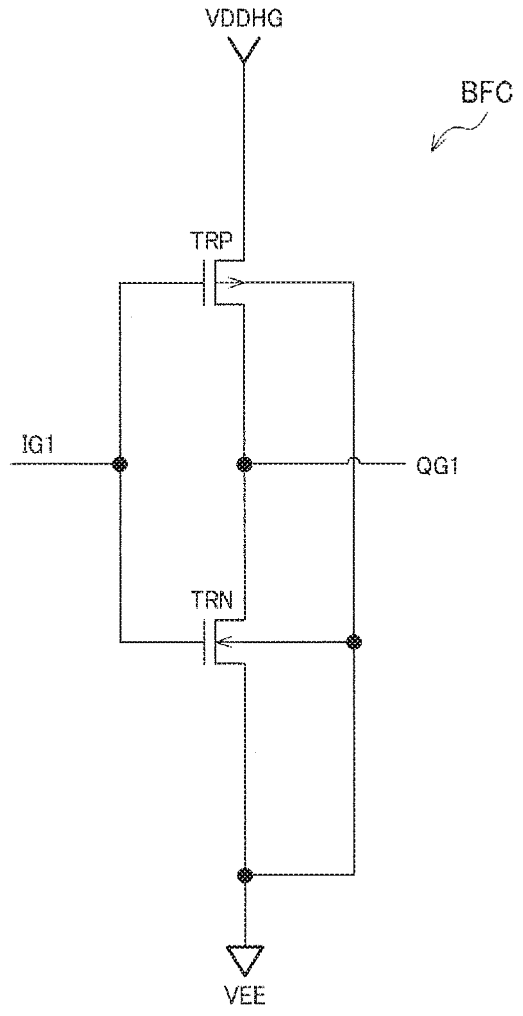
FIG. 5 is an exemplary configuration of a buffer circuit of a scan line drive circuit.

The breakdown voltage of a transistor is the breakdown voltage of transistors included in the scan line drive circuit 21. Specifically, the scan line drive circuit 21 includes a buffer circuit BFC for outputting a driving signal to a scan line, as shown in FIG. 5. The buffer circuit BFC includes a P-type transistor TRP and an N-type transistor TRN. A source of the P-type transistor TRP is connected to a node of the power supply voltage VDDHG, a drain is connected to an output node QG1, and a gate is connected to an input node IG1. A source of the N-type transistor TRN is connected to a node of the power supply voltage VEE, a drain is connected to the output node QG1, and the gate is connected to the input node IG1. It is possible that a voltage VDDHG−VEE is applied between terminals of the transistors TRP and TRN. For example, when the transistor TRP is turned on, and the transistor TRN is turned off, the voltage VDDHG−VEE is applied between the gate and source of the transistor TRP. That is, the setting of the control signals with which the voltage VDDHG−VEE exceeds the breakdown voltage of the transistor TRP or TRN is an inhibited setting.

Note that one buffer circuit that drives one scan line is illustrated in FIG. 5, as an example, in actuality, the scan line drive circuit 21 includes a plurality of buffer circuits for driving a plurality of scan lines.

FIG. 6 shows an example of the voltages VONREG, VOFREG, and VGL that are respectively designated by the control data PA[3:0], PB[1:0], and PC[4:0]. Also, FIG. 7 is a diagram illustrating inhibited settings in which the difference between the power supply voltages VEE and VDDHG exceeds the breakdown voltage of a transistor.

In FIG. 6, the pieces of control data PB[1:0], PA[3:0], and PC[4:0] are shown in hexadecimal numbers. As shown in FIG. 6, the voltage values of the voltage VONREG are set so as to be associated with the respective setting values of the control data PA[3:0], the voltage values of the voltage VOFREG are set so as to be associated with the respective setting values of the control data PB[1:0], and the voltage values of the voltage VGL are set so as to be associated with the respective setting values of the control data PC[4:0].

The voltage values of the power supply voltage VDDHG with respect to the respective voltage values of the voltages VGL and VONREG are shown in FIG. 7. Since the power supply voltage VEE=−3×VOFREG, the power supply voltage VEE takes one of four values, namely −13.5 V, −14 V, −14.5 V, and −15 V, in correspondence with PB[1:0]. For example, assume that the allowable voltage of the transistors is VDDHG−VEE±32 V. When VEE=−15 V, because the allowable range is VDDHG±17 V, VDDHG>17 V is an inhibited setting. In FIG. 7, the outside of a region surrounded by the thick solid lines indicates inhibited settings of VDDHG when VEE=−15 V. Since VDDHG is generated from VONREG and VGL, the inhibited setting of VDDHG means that the setting values of PA[3:0] and PC[4:0] with which VDDHG>17 V occurs are inhibited settings. Similarly, VDDHG>17.5 V is an inhibited setting when VEE=−14.5 V, VDDHG>18 V is an inhibited setting when VEE=−14 V, and VDDHG>18.5 V is an inhibited setting when VEE=−13.5 V. Note that the inhibited setting on a lower voltage side of VDDHG is determined based on a specification issue and the like.

As described above, the settings of the pieces of control data PB[1:0], PA[3:0], PC[4:0] with which the resultant voltage exceeds the breakdown voltage of transistors are determined as the inhibited settings. The monitoring circuits M1 and M2 are constituted by combinational circuits of logic elements that detect such inhibited settings.

According to the present embodiment, because the settings with which the resultant voltage exceeds the breakdown voltage of transistors can be detected as the inhibited settings, transistors can be prevented from being applied the voltages exceeding the breakdown voltage. That is, when a disconnection or the like in the control signal lines occurs, it is possible that, in spite of the control circuit 50 outputting an appropriate control signal, the control signal that is input to the power supply circuit 60 is in an inhibited setting. According to the present embodiment, even in such a case, as a result of the monitoring circuit M2 monitoring the control signal on the power supply circuit 60 side, transistors can be prevented from being applied the voltages exceeding the breakdown voltage.

3. Second Exemplary Configuration

Figure 8:
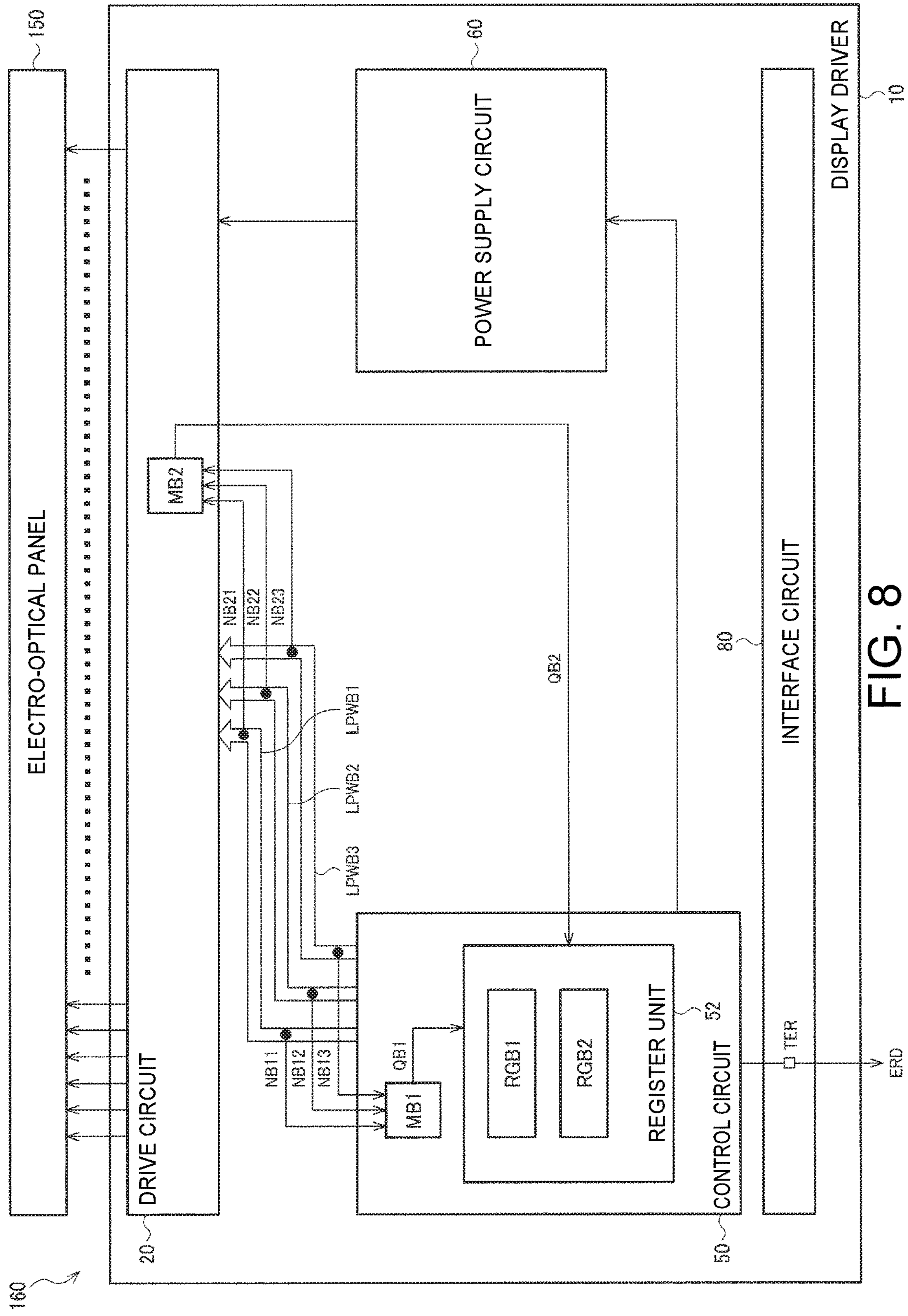
FIG. 8 is a second exemplary configuration of the display driver of the present embodiment.

FIG. 8 shows a second exemplary configuration of the display driver 10 of the present embodiment. The display driver 10 includes the drive circuit 20, the control circuit 50, the power supply circuit 60, control signal lines LPWB1 to LPWB3, and monitoring circuits MB1 and MB2. Also, the display driver 10 may include an interface circuit 80. Note that the descriptions of the constituent elements described in FIG. 1 will be omitted as appropriate. Also, the configurations in FIGS. 1 and 8 may be combined. That is, the display driver 10 in FIG. 1 may further include the monitoring circuits MB1 and MB2, the control signal lines LPWB1 to LPWB3, and registers RGB1 and RGB2.

The control circuit 50 controls the drive circuit 20 based on a control signal. For example, the control circuit 50 controls an operation sequence such as a drive sequence of the drive circuit 20. For example, the control circuit 50 controls the drive sequence of data lines of the drive circuit 20, and controls the selection sequence of scan lines of the drive circuit 20. Note that, as described in FIG. 1, the control signal may be a parallel signal or a serial signal. In the following, a case will be described where the control circuit 50 controls the drive circuit 20 using 3-bit control data as the control signal, and the 3-bit control data is transmitted through three control signal lines as a parallel signal, as an example, but there is no limitation thereto. That is, the control circuit 50 need only control the drive circuit 20 based on a multi-bit signal or a 1-bit signal. Also, the control circuit 50 may output the multi-bit control data to the drive circuit 20 as a serial signal. In this case, the number of control signal lines is less than the number of bits of the control data.

The control signal from the control circuit 50 is transmitted to the drive circuit 20 through the control signal lines LPWB1 to LPWB3. The control circuit 50 outputs a 1-bit signal to one control signal line. That is, a signal at a high level or a low level is output to each of the control signal lines LPWB1 to LPWB3. The control signal lines LPWB1 to LPWB3 constitutes a signal path through which a parallel-signal control signal is transmitted. The control signal lines LPWB1 to LPWB3 are realized by an aluminum interconnect layer or the like that is formed on a semiconductor substrate of a display driver 10, which is a semiconductor chip. Note that the number of control signal lines is not limited to three, and it is sufficient that the display driver 10 is provided with at least one control signal line.

The monitoring circuit MB1 is a circuit that monitors the control signal on the control circuit 50 side. The monitoring circuit MB2 is a circuit that monitors the control signal on the drive circuit 20 side. A 3-bit signal is output to the control signal lines LPWB1 to LPWB3. The monitoring circuits MB1 and MB2 monitor the control signal by determining whether or not the combination of logic levels of the 3 bits is an inhibited setting. The monitoring circuit MB1 is a first monitoring circuit, and the monitoring circuit MB2 is a second monitoring circuit.

Specifically, the monitoring circuit MB1 monitors the voltages at nodes NB11 to NB13, of the control signal lines LPWB1 to LPWB3, that are closer to the control circuit 50 than to the drive circuit 20. Also, the monitoring circuit MB1 outputs the monitoring result to the control circuit 50. For example, the monitoring circuit MB1 outputs the monitoring result to the control circuit 50 as a detection signal QB1. The nodes, of the control signal lines LPWB1 to LPWB3, that are closer to the control circuit 50 than to the drive circuit 20 are nodes, on routes of the control signal lines LPWB1 to LPWB3, whose distances to the control circuit 50 are smaller than those to the drive circuit 20. That is, as shown in FIG. 8, the distances between the nodes NB11 to NB13 and the control circuit 50 are respectively smaller than the distances between the nodes NB11 to NB13 and the drive circuit 20, on the routes of the control signal lines LPWB1 to LPWB3.

For example, the monitoring circuit MB1 is provided inside the control circuit 50. That is, the monitoring circuit MB1 is placed in the placement region of the control circuit 50. Also, the monitoring circuit MB1 monitors the control signal at the output nodes NB11 to NB13 to the control signal lines LPWB1 to LPWB3 in the control circuit 50.

That is, the monitoring circuit MB1 monitors the control signal of the control signal lines LPWB1 to LPWB3 inside the control circuit 50.

The monitoring circuit MB2 monitors the voltages at nodes NB21 to NB23, of the control signal lines LPWB1 to LPWB3, that are closer to the drive circuit 20 than to the control circuit 50. Also, the monitoring circuit MB2 outputs the monitoring result to the control circuit 50. For example, the monitoring circuit MB2 outputs the monitoring result to the control circuit 50 as a detection signal QB2. The nodes, of the control signal lines LPWB1 to LPWB3, that are closer to the drive circuit 20 than to the control circuit 50 are nodes, on routes of the control signal lines LPWB1 to LPWB3, whose distances to the drive circuit 20 are smaller than those to the control circuit 50. That is, as shown in FIG. 8, the distances between the nodes NB21 to NB23 and the drive circuit 20 are respectively smaller than the distances between the nodes NB21 to NB23 and the control circuit 50, on the routes of the control signal lines LPWB1 to LPWB3.

For example, the monitoring circuit MB2 is provided inside the drive circuit 20. That is, the monitoring circuit MB2 is placed in the placement region of the drive circuit 20. Also, the monitoring circuit MB2 monitors the control signal at the input nodes NB21 to NB23 of the control signal lines LPWB1 to LPWB3 in the drive circuit 20. That is, the monitoring circuit M2 monitors the control signal of the control signal lines LPWB1 to LPWB3 inside the drive circuit 20.

Note that the monitoring circuits MB1 and MB2 can be realized by combinational circuits of logic elements similarly to the monitoring circuits M1 and M2 in FIG. 2. The monitoring circuits MB1 and MB2 are combinational circuits of the same configuration. That is, if the control signals input to the respective monitoring circuits MB1 and MB2 are at the same logic level, the detection signals QB1 and QB2 are at the same logic level.

According to the present embodiment, when an anomaly such as a disconnection occurs in the control signal lines LPWB1 to LPWB3, the occurrence of the anomaly can be detected by the monitoring circuit MB2 provided on the drive circuit 20 side monitoring the control signal at the nodes NB21 to NB23. That is, not only an anomaly on the control circuit 50 side, but also an anomaly on the drive circuit 20 side can be detected. Also, the control circuit 50 can be notified of the occurrence of an anomaly using the detection signal QB2, and as a result, anomalous operation due to an inhibited setting can be prevented from being performed and the reliability thereof can be improved. Also, when an anomaly in which the control circuit 50 does not output an appropriate control signal has occurred, the occurrence of the anomaly can be detected by the monitoring circuit MB1 provided on the control signal side monitoring the control signal at the nodes NB11 to NB13. Also, the control circuit 50 can be notified of the occurrence of an anomaly using the detection signal QB1, and as a result, anomalous operation due to an inhibited setting can be prevented from being performed and the reliability thereof can be improved. Accordingly, the display driver 10 can be provided that can be favorably installed in an electronic apparatus such as an on-board apparatus requiring high reliability.

Also, according to the present embodiment, when an anomalous operation or the like of the analog circuit has occurred, it is possible to easily analyze whether the anomalous operation or the like is an anomaly caused by an inadequate control signal having been output from the control circuit 50, or an anomaly caused by a disconnection or the like in the control signal lines LPWB1 to LPWB3. For example, if the detection signal QB1 from the monitoring circuit MB1 indicates an anomaly, it can be analyzed that the anomaly is caused by an inadequate control signal having been output from the control circuit 50. On the other hand, if the detection signal QB2 from the monitoring circuit MB2 indicates an anomaly, it can be analyzed that the anomaly is caused by a disconnection or the like in the control signal lines LPWB1 to LPWB3. Therefore, the analysis to be performed when an anomaly has occurred can be facilitated.

The display driver 10 includes the interface circuit 80, as shown in FIG. 8. Also, the control circuit 50 includes the register unit 52. These elements will be described in the following.

The register unit 52 includes a register RGB1 to which an error detection result based on the detection signal QB1 is stored, and a register RGB2 to which an error detection result based on the detection signal QB2 is stored.

The control circuit 50 performs processing for notifying an external device of the error, when one of the monitoring result of the monitoring circuit MB1 and the monitoring result of the monitoring circuit MB2 indicates that an error has been detected. For example, the control circuit 50 detects an error indicated by the monitoring result of the monitoring circuit MB1 based on the detection signal QB1 from the monitoring circuit MB1. That is, the control circuit 50 detects error information of the control signal at the nodes NB11 to NB13 based on the detection signal QB1. Also, the control circuit 50 detects an error indicated by the monitoring result of the monitoring circuit MB2 based on the detection signal QB2 from the monitoring circuit MB2. That is, the control circuit 50 detects error information of the control signal at the nodes NB21 to NB23 based on the detection signal QB2. When an error occurs that is an anomaly in which an appropriate control signal is not output from the control circuit 50, for example, the control circuit 50 is notified of the error using the detection signal QB1. Also, when an error occurs that is an anomaly in which a disconnection or the like occurs in the control signal lines LPWB1 to LPWB3, the control circuit 50 is notified of the error using the detection signal QB2. Also, the control circuit 50 performs processing for notifying an external device, such as a host, of an occurrence of this error. In this way, the external device can execute appropriate processing for handling the error that has occurred. For example, the external device such as a host, upon determining that an error has occurred in the output of the control signal based on the monitoring result of the monitoring circuit MB1, initializes the setting stored in the register of the register unit 52 via the interface circuit 80. The setting here is a setting corresponding to the control signal of the control signal lines LPWB1 to LPWB3. Also, the external device such as a host, upon determining that an error such as a disconnection of the control signal lines LPWB1 to LPWB3 has occurred based on the monitoring result of the monitoring circuit MB2, instructs to turn off the operation of the power supply circuit 60.

Also, the display driver 10 of the present embodiment includes the terminal TER for outputting the error detection signal ERD to an external device. The external device such as a host can determine that the monitoring circuit M1 or M2 has detected an error using the error detection signal ERD output from the terminal TER.

A detection flag based on the monitoring result of the monitoring circuit MB1 is set to the register RGB1, and a detection flag based on the monitoring result of the monitoring circuit MB2 is set to the register RGB2. The register RGB1 is a first register, and the register RGB2 is a second register. The registers RGB1 and RGB2 can be realized by a flip-flop circuit or the like. The registers RGB1 and RGB2 may also be realized by a semiconductor memory such as a RAM. When the monitoring circuit MB1 has detected an error, the detection flag of the register RGB1 is set to "1", for example. When the monitoring circuit MB2 has detected an error, the detection flag of the register RGB2 is set to "1", for example. Also, the external device can access the registers RGB1 and RGB2 via the interface circuit 80. Therefore, the external device can determine that the monitoring circuit MB1 or MB2 has detected an error by reading out the detection flags of the registers RGB1 and RGB2. Specifically, when one of the plurality of error detection circuits including the monitoring circuits MB1 and MB2 has detected an error, the error detection signal ERD is output from the terminal TER, as an interrupt signal to the external device. That is, the error detection signal ERD is activated. When the detection signal ERD is activated in this way, the external device accesses the register unit 52, and analyses the error factor. Then, if the detection flag of the register RGB1 is set to "1", the external device determines that the monitoring circuit MB1 has detected an error. If the error detection flag of the register RGB2 is set to "1", the external device determines that the monitoring circuit MB2 has detected an error. With this, the external device can execute appropriate processing for handling the detected error.

4. Detailed Exemplary Configuration

Figure 9:
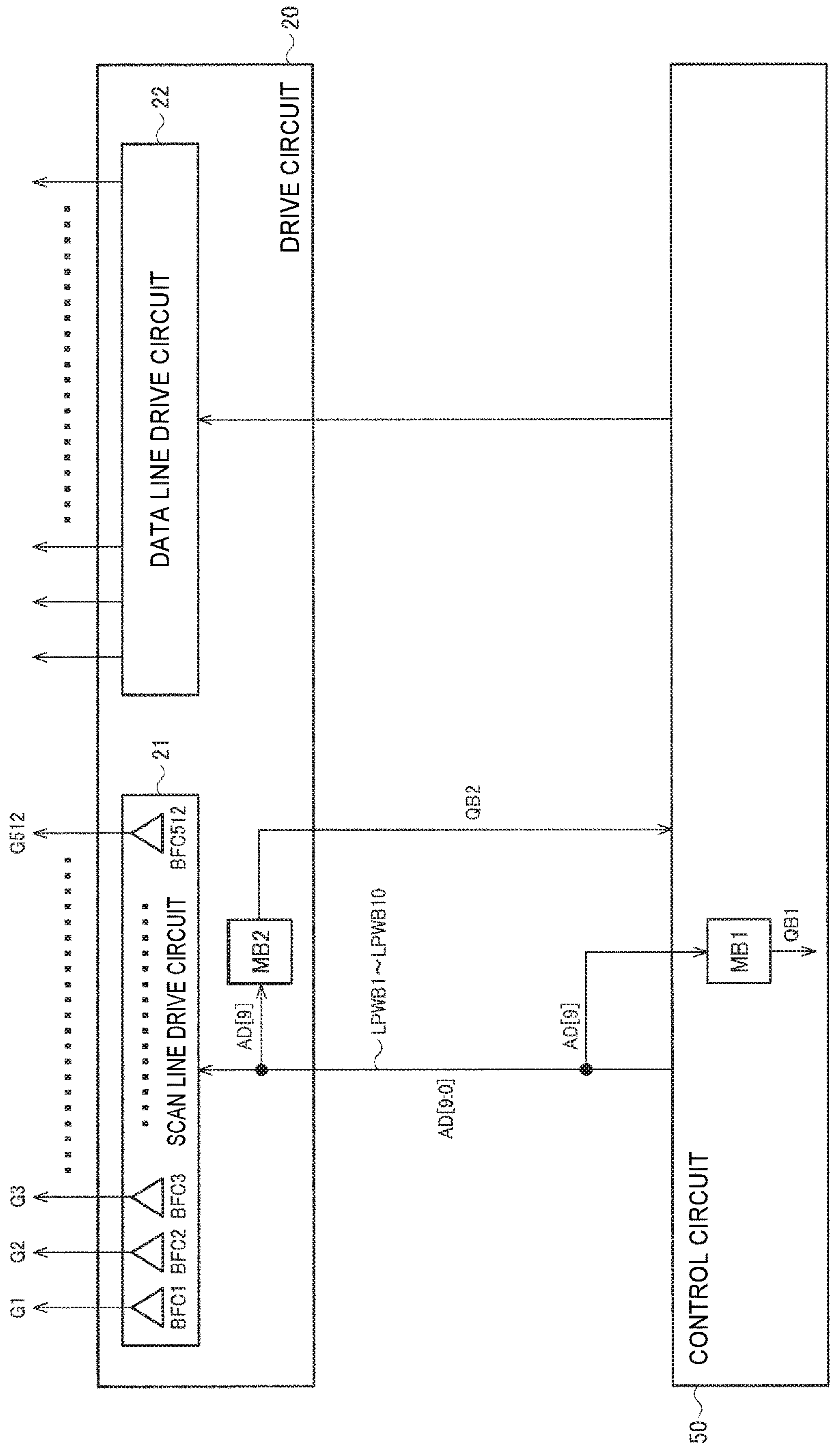
FIG. 9 is a detailed exemplary configuration of the scan line drive circuit and a third exemplary connection of the monitoring circuit.

FIG. 9 is a detailed exemplary configuration of the scan line drive circuit 21 and a third exemplary connection of the monitoring circuits MB1 and MB2.

The scan line drive circuit 21 includes a plurality of buffer circuits that drives a plurality of scan lines of the electro-optical panel 150. A buffer circuit BFCi drives a scan line Gi. That is, the buffer circuit BFCi selects the scan line Gi by outputting a driving signal to the scan line Gi. i is an integer of one or more and 512 or less. Note that, here, a case where the scan line drive circuit 21 includes 512 buffer circuits BFC1 to BFC512 as the plurality of buffer circuits will be described as an example, but any number of the buffer circuits can be included in the scan line drive circuit 21.

The control circuit 50 outputs an address AD[9:0] for designating the scan line to be selected to the scan line drive circuit 21. As shown in FIG. 10, the scan lines are designated by the values of AD[8:0]. That is, when AD[8:0]=i, the scan line drive circuit 21 enables the buffer circuit BFCi, and the buffer circuit BFCi drives the scan line Gi. In a normal operation, that is, in a non-test mode, AD[9]=0.

As shown in FIG. 11, AD[9]=1 indicates a test mode. This test mode is used when shipping inspection is performed on the display driver 10, and is not used in a normal operation. That is, AD[9]=1 is inhibited in a normal operation. The inhibited setting, here, is a setting in which the address AD[9:0] for designating which of the buffer circuits BFC1 to BFC512 is to be enabled indicates a test mode. Specifically, AD[9]=1 is the inhibited setting, and any value is allowed for AD[8:0].

The bit signals of the address AD[9:0] constitute the above-described control signal. That is, in FIG. 9, the 10-bit signal of AD[9:0] is transmitted through ten control signal lines LPWB1 to LPWB10. The monitoring circuits MB1 and MB2 monitor the control signal at a control signal line through which AD[9] is transmitted. That is, the monitoring circuits MB1 and MB2 monitor the logic level of AD[9]. The monitoring circuit MB1 monitors whether or not the setting of the control signal is an inhibited setting on the control circuit 50 side. The monitoring circuit MB2 monitors whether or not the setting of the control signal is an inhibited setting on the drive circuit 20 side. In this exemplary connection, the monitoring circuits MB1 and MB2 are each realized by two-stage inverters that are connected in series. The two-stage inverters outputs a detection signal by buffering AD[9]. If AD[9]=1, the detection signal is "1", and the inhibited setting is detected.

5. Electronic Apparatus and Mobile Body

Figure 12:
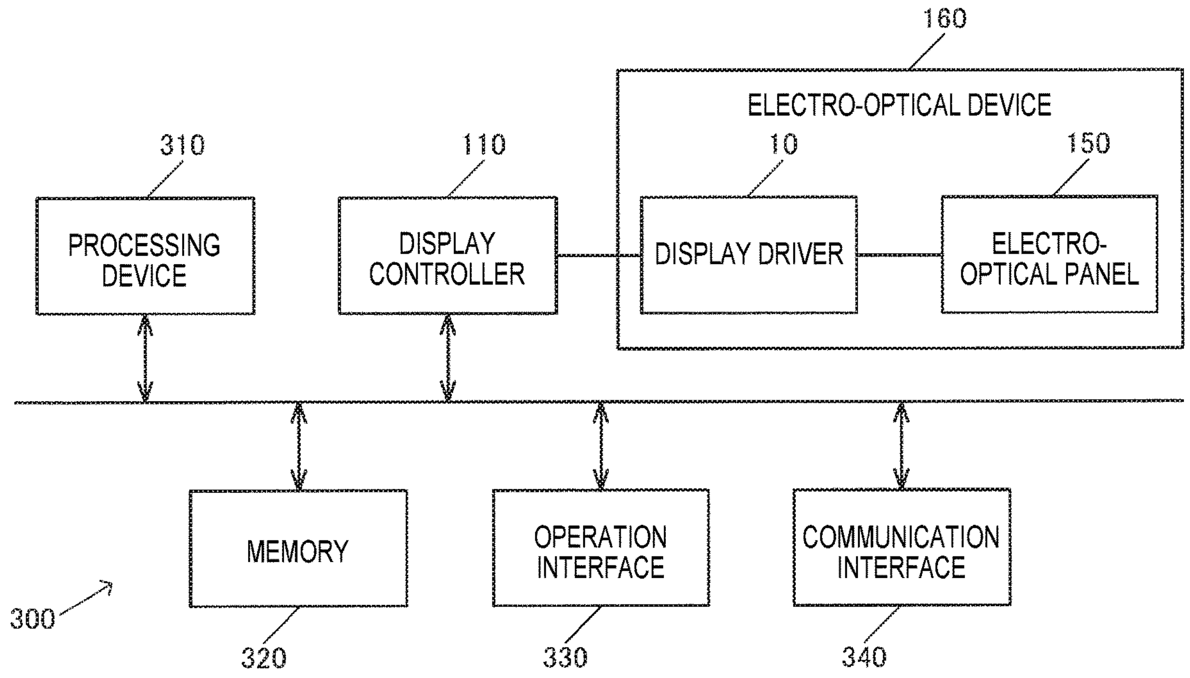
FIG. 12 is an exemplary configuration of an electronic apparatus.

FIG. 12 shows an exemplary configuration of an electronic apparatus 300 including the display driver 10 of the present embodiment. The electronic apparatus 300 includes a display driver 10, an electro-optical panel 150, a display controller 110, a processing device 310, a memory 320, an operation interface 330, and a communication interface 340. An electro-optical device 160 is constituted by the display driver 10, which is a circuit device, and the electro-optical panel 150. Specific examples of the electronic apparatus 300 includes various types of electronic apparatuses, which are a panel apparatus such as a meter panel and a car navigation system, which are on-board apparatuses, a projector, a head mounted display, a printing device, a mobile information terminal, a mobile game terminal, a robot, and an information processing device.

The processing device 310 performs processing for controlling the electronic apparatus 300, various types of signal processing, and the like. The processing device 310 is a host, which is an external device, for example. The processing device 310 can be realized by a processor such as a CPU or an MPU, an ASIC, or the like. The memory 320 stores data from the operation interface 330 and the communication interface 340, and functions as a work memory of the processing device 310, for example. The memory 320 can be realized by a semiconductor memory such as a RAM or ROM, or a magnetic storage device such as a hard disk drive, for example. The operation interface 330 is a user interface for accepting various operations made by a user. For example, the operation interface 330 can be realized by a button, a mouse, and a keyboard, or a touch panel mounted in an electro-optical panel 150. The communication interface 340 is an interface for performing communication of image data and control data. The communication processing of the communication interface 340 may be wired communication processing or wireless communication processing.

Figure 13:
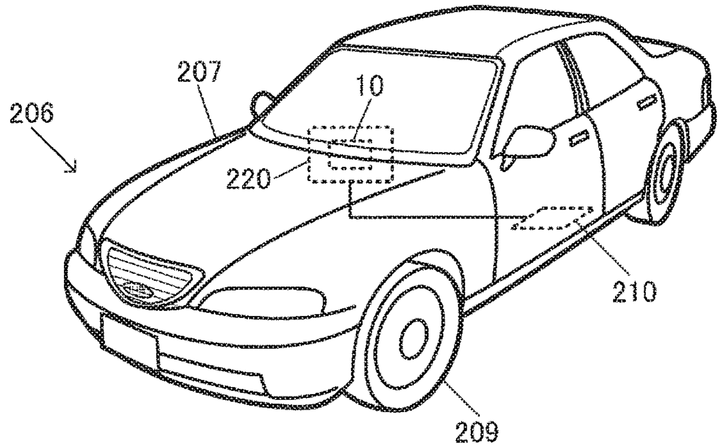
FIG. 13 is an exemplary configuration of a mobile body.

FIG. 13 shows an exemplary configuration of a mobile body including the display driver 10 of the present embodiment. The mobile body is an apparatus or device that includes a drive mechanism such as an engine or a motor, a steering mechanism such as a steering wheel or a rudder, and various electronic apparatuses, for example, and moves on the ground, in the air, or on the sea. A car, an airplane, a motorcycle, a ship, a robot, or the like can be envisioned as the mobile body of the present embodiment. FIG. 13 schematically illustrates an automobile 206 serving as a specific example of the mobile body. The automobile 206 includes a car body 207 and wheels 209. A display device 220 including the display driver 10 and a control device 210 that controls the units of the automobile 206 are incorporated in the automobile 206. The control device 210 may include an ECU (Electronic Control Unit) and the like. The display device 220 is realized by the electro-optical device 160, and is a panel apparatus such as a meter panel. The control device 210 generates an image to be displayed to a user, and transmits the image to the display device 220. The display device 220 displays the received image in a display unit of the display device 220. For example, various pieces of information such as a speed, a remaining fuel amount, a travel distance, and various device settings are displayed as images.

As described above, the display driver of the present embodiment includes a power supply circuit that generates at least one power supply voltage, a drive circuit that drives an electro-optical panel based on the at least one power supply voltage, and a control circuit that controls the power supply circuit based on a control signal. Also, the display driver includes a first monitoring circuit that monitors the control signal on the control circuit side, and a second monitoring circuit that monitors the control signal on the power supply circuit side.

According to the present embodiment, a control signal output by the control circuit is supplied to the power supply circuit, and the power supply circuit generates a power supply voltage based on the control signal from the control circuit. Also, the first monitoring circuit monitors the control signal on the control circuit side, and the second monitoring circuit monitors the control signal on the power supply circuit side. With this configuration, in addition to an anomaly in the control signal itself output from the control circuit or the like being able to be monitored by the first monitoring circuit, an anomaly in the control signal on the power supply circuit side can be monitored by the second monitoring circuit. With this, an anomaly in which the control signal for controlling the power supply circuit is set to an inhibited setting can be prevented, and the analysis when such an anomaly has occurred can be facilitated.

Also, in the present embodiment, the display driver may include a control signal line through which the control signal is transmitted. The first monitoring circuit may monitor the control signal at a node, of the control signal line, that is closer to the control circuit than to the power supply circuit. The second monitoring circuit may monitor the control signal at a node, of the control signal line, that is closer to the power supply circuit than to the control circuit.

According to the present embodiment, the first monitoring circuit monitors the control signal at a node, of the control signal line, that is closer to the control circuit, and the second monitoring circuit monitors the control signal at a node, of the control signal line, that is closer to the power supply circuit. With this configuration, in addition to an anomaly in the control signal itself output from the control circuit or the like being able to be monitored by the first monitoring circuit, an anomaly in the control signal such as a disconnection can be monitored by the second monitoring circuit.

Also, in the present embodiment, the control circuit may control the power supply circuit using control data constituted by a plurality of bits as the control signal. The first monitoring circuit may monitor, on the control circuit side, whether or not the combination of logic levels of the plurality of bits is an inhibited setting. The second monitoring circuit may monitor, on the power supply circuit side, whether or not the combination of logic levels of the plurality of bits is an inhibited setting.

According to the present embodiment, as a result of the first and second monitoring circuits monitoring whether or not the combination of logic levels of the plurality of bits in the control data is an inhibited setting, an anomaly can be prevented in which the operation setting of the power supply circuit is set to an inhibited setting. The inhibited setting refers to a setting that is inhibited due to a specification issue or from a design viewpoint, because the setting may incur an anomalous operation, a failure, or a breakdown of the power supply circuit.

Also, in the present embodiment, the power supply circuit may generate a first power supply voltage and a second power supply voltage, as the at least one power supply voltage. The first monitoring circuit may monitor, on the control circuit side, whether or not the setting of the control signal is an inhibited setting in which the voltage difference between the first power supply voltage and the second power supply voltage exceeds the breakdown voltage of a transistor. The second monitoring circuit may monitor, on the power supply circuit side, whether or not the setting of the control signal is an inhibited setting in which the voltage difference between the first power supply voltage and the second power supply voltage exceeds the breakdown voltage of a transistor.

According to the present embodiment, as a result of the first and second monitoring circuits monitoring whether or not the setting of the control signal is an inhibited setting in which the voltage difference between the first power supply voltage and the second power supply voltage exceeds the breakdown voltage of a transistor, an anomaly can be prevented in which a voltage exceeding the breakdown voltage is applied to a transistor of the drive circuit.

Also, in the present embodiment, the display driver includes a drive circuit that drives an electro-optical panel, and a control circuit that control the drive circuit based on a control signal. Also, the display driver includes a first monitoring circuit that monitors the control signal on the control circuit side, and a second monitoring circuit that monitors the control signal on the drive circuit side.

According to the present embodiment, a control signal output from the control circuit is supplied to the drive circuit, and the drive circuit drives the electro-optical panel based on the control signal from the control circuit. Also, the first monitoring circuit monitors the control signal on the control circuit side, and the second monitoring circuit monitors the control signal on the drive circuit side. With this configuration, in addition to an anomaly in the control signal itself output from the control circuit or the like being able to be monitored by the first monitoring circuit, an anomaly in the control signal on the power supply circuit side can be monitored by the second monitoring circuit. With this, an anomaly in which the control signal for controlling the power supply circuit is set to an inhibited setting can be prevented, and the analysis when such an anomaly has occurred can be facilitated.

Also, in the present embodiment, the display driver may include a control signal line through which a control signal is transmitted. The first monitoring circuit may monitor the control signal at a node, of the control signal line, that is closer to the control circuit than to the drive circuit. The second monitoring circuit may monitor the control signal at a node, of the control signal line, that is closer to the drive circuit than to the control circuit.

According to the present embodiment, the first monitoring circuit monitors the control signal at a node, of the control signal line, that is closer to the control circuit, and the second monitoring circuit monitors the control signal at a node, of the control signal line, that is closer to the drive circuit. With this configuration, in addition to an anomaly in the control signal itself output from the control circuit or the like being able to be monitored by the first monitoring circuit, an anomaly in the control signal such as a disconnection can be monitored by the second monitoring circuit.

Also, in the present embodiment, the control circuit may control the drive circuit using control data constituted by a plurality of bits as the control signal. The first monitoring circuit may monitor, on the control circuit side, whether or not the combination of logic levels of the plurality of bits is an inhibited setting. The second monitoring circuit may monitor, on the drive circuit side, whether or not the combination of logic levels of the plurality of bits is an inhibited setting.

According to the present embodiment, as a result of the first and second monitoring circuits monitoring whether or not the combination of logic levels of the plurality of bits in the control data is an inhibited setting, an anomaly can be prevented in which the operation setting of the drive circuit is set to an inhibited setting. The inhibited setting refers to a setting that is inhibited due to a specification issue or from a design viewpoint, because the setting may incur an anomalous operation, a failure, or a breakdown of the drive circuit.

Also, in the present embodiment, the drive circuit may include a plurality of buffer circuits that drive a plurality of scan lines of the electro-optical panel. The control signal may be an address signal for designating which of the plurality of buffer circuits will be enabled. The first monitoring circuit may monitor, on the control circuit side, whether or not the address is in an inhibited setting. The second monitoring circuit may monitor, on the drive circuit side, whether or not the address is in an inhibited setting.

According to the present embodiment, as a result of the first and second monitoring circuits monitoring whether or not the setting of an address for designating which of the plurality of buffer circuits is to be enabled is an inhibited setting, an anomalous operation of the plurality of buffer circuits that drive the plurality of scan lines can be prevented.

Also, in the present embodiment, when one of the monitoring result of the first monitoring circuit and the monitoring result of the second monitoring circuit indicates that an error has occurred, the control circuit may perform processing for notifying an external device of the error.

In this way, the external device can execute appropriate processing for handling the error that has occurred.

Also, in the present embodiment, the display driver may include a terminal for outputting an error detection signal to an external device.

Accordingly, the external device can determine that the first or second monitoring circuit has detected an error using the error detection signal output from the terminal.

Also, in the present embodiment, the display driver may include a first register to which an error detection flag is set depending of the monitoring result of the first monitoring circuit, and a second register to which an error detection flag is set depending on the monitoring result of the second monitoring circuit.

In this way, when the first or second monitoring circuit has detected an error, the error factor can be appropriately notified using the error detection flags.

Also, the present embodiment relates to an electronic apparatus including the display driver described above.

Also, the present embodiment relates to a mobile body including the display driver described above.

Note that although an embodiment has been described in detail above, a person skilled in the art will readily appreciate that it is possible to implement numerous variations and modifications that do not depart substantially from the novel aspects and effect of the invention. Accordingly, all such variations and modifications are also to be included within the scope of the invention. For example, terms that are used within the description or drawings at least once together with broader terms or alternative synonymous terms can be replaced by those other terms at other locations as well within the description or drawings. Also, all combinations of the embodiment and variations are also encompassed in the range of the invention. Moreover, the configuration and operation of the display driver, the electro-optical panel, the electro-optical device, the electronic apparatus, and the mobile body are not limited to those described in the present embodiment, and various modifications are possible.

What is claimed is:

1. A display driver comprising:

a power supply circuit configured to generate at least one power supply voltage;

a drive circuit configured to drive an electro-optical panel based on the at least one power supply voltage;

a control circuit configured to control the power supply circuit based on a control signal that is transmitted from the control circuit to the power supply circuit between a control circuit side and a power supply circuit side;

a control signal line connected between the control circuit and the power supply circuit and configured to transmit the control signal from the control circuit to the power supply circuit, the control signal line having a first portion connected to the control circuit and a second portion connected to the power supply circuit, the first portion being closer to the control circuit than to the power supply circuit, the second portion being closer to the power supply circuit than to the control circuit;

a first monitoring circuit configured to monitor the control signal at the first portion during transmission of the control signal from the control circuit to the power supply circuit on the control circuit side; and a second monitoring circuit configured to monitor the control signal at the second portion during transmission of the control signal from the control circuit to the power supply circuit on the power supply circuit side.

2. The display driver according to claim 1, further comprising a control signal line through which the control signal is transmitted, wherein the first monitoring circuit is configured to monitor the control signal at a node, of the control signal line, that is closer to the control circuit than to the power supply circuit, and the second monitoring circuit is configured to monitor the control signal at a node, of the control signal line, that is closer to the power supply circuit than to the control circuit.

3. The display driver according to claim 1, wherein the control circuit is configured to control the power supply circuit with use of control data constituted by a plurality of bits as the control signal, the first monitoring circuit is configured to monitor, on the control circuit side, whether or not the combination of logic levels of the plurality of bits is an inhibited setting, and the second monitoring circuit is configured to monitor, on the power supply circuit side, whether or not the combination of logic levels of the plurality of bits is an inhibited setting.

4. The display driver according to claim 1, wherein the power supply circuit is configured to generate a first power supply voltage and a second power supply voltage as the at least one power supply voltage, the first monitoring circuit is configured to monitor, on the control circuit side, whether or not the setting of the control signal is an inhibited setting in which the voltage difference between the first power supply voltage and the second power supply voltage exceeds the breakdown voltage of a transistor, and the second monitoring circuit is configured to monitor, on the power supply circuit side, whether or not the setting of the control signal is an inhibited setting in which the voltage difference between the first power supply voltage and the second power supply voltage exceeds the breakdown voltage of a transistor.

5. A display driver comprising:

a drive circuit configured to drive an electro-optical panel;

a control circuit configured to control the drive circuit based on a control signal that is transmitted from the control circuit to the drive circuit between a control circuit side and a drive circuit side;

a control signal line connected between the control circuit and the drive circuit and configured to transmit the control signal from the control circuit to the drive circuit, the control signal line having a first portion connected to the control circuit and a second portion connected to the drive circuit, the first portion being closer to the control circuit than to the drive circuit, the second portion being closer to the drive circuit than to the control circuit;

a first monitoring circuit configured to monitor the control signal at the first portion during transmission of the control signal from the control circuit to the drive circuit on the control circuit side, and a second monitoring circuit configured to monitor the control signal at the second portion during transmission of the control signal from the control circuit to the drive circuit on the drive circuit side.

6. The display driver according to claim 5, further comprising a control signal line through which the control signal is transmitted, wherein the first monitoring circuit is configured to monitor the control signal at a node, of the control signal line, that is closer to the control circuit than to the drive circuit, and the second monitoring circuit is configured to monitor the control signal at a node, of the control signal line, that is closer to the drive circuit than to the control circuit.

7. The display driver according to claim 5, wherein the control circuit is configured to control the drive circuit using control data constituted by a plurality of bits as the control signal, the first monitoring circuit is configured to monitor, on the control circuit side, whether or not the combination of logic levels of the plurality of bits is an inhibited setting, and the second monitoring circuit is configured to monitor, on the drive circuit side, whether or not the combination of logic levels of the plurality of bits is an inhibited setting.

8. The display driver according to claim 5, wherein the drive circuit includes a plurality of buffer circuits that drive a plurality of scan lines of the electro-optical panel, the control signal is an address signal for designating which of the plurality of buffer circuits is to be enabled, the first monitoring circuit is configured to monitor, on the control circuit side, whether or not the address is in an inhibited setting, and the second monitoring circuit is configured to monitor, on the drive circuit side, whether or not the address is in an inhibited setting.

9. The display driver according to claim 1, wherein the control circuit is configured to, when one of a monitoring result of the first monitoring circuit and a monitoring result of the second monitoring circuit indicates that an error has been detected, perform processing for notifying an external device of the error.

10. The display driver according to claim 9, further comprising a terminal for outputting the error detection signal to the external device.

11. The display driver according to claim 9, further comprising:

a first register to which an error detection flag is set depending on a monitoring result of the first monitoring circuit; and a second register to which an error detection flag is set depending on a monitoring result of the second monitoring circuit.

12. An electronic apparatus comprising:

the display driver according to claim 1.

13. A mobile body comprising:

the display driver according to claim 1.

* * * * *